Nov. 20, 1956   M. BABUNOVIC ET AL   2,771,108
CUTTER FOR WOODWORKING MACHINE
Filed May 26, 1954

INVENTORS.
MOMIR BABUNOVIC
BY NORRIS D. DALTON

John H. Cassidy

ATTORNEY

United States Patent Office 2,771,108
Patented Nov. 20, 1956

2,771,108

CUTTER FOR WOODWORKING MACHINE

Momir Babunovic, St. Louis, and Norris D. Dalton, Affton, Mo., assignors to Quirk Machinery Company, St. Louis, Mo., a corporation of Delaware Application May 26, 1954, Serial No. 432,507

3 Claims. (Cl. 144—229)

This invention pertains to cutters for woodworking machines. More particularly, it is intended for a machine for trimming shoe heels, spherical or circular objects.

In the type of machine for which this cutter is intended, the shoe heel is trimmed in one pass of the cutter around the heel so that the cut must be made in both directions with reference to the grain of the wood.

An object of the invention is to provide a cutter for such an operation so formed and mounted that the cut of each blade begins at the leading end of the blade and thereafter proceeds along the blade in a sort of slicing cut. At the same time, the blade is so formed and mounted that a suitable rake angle is maintained throughout the cut.

In accordance with this invention, generally stated, a cutter head is provided, adapted to be mounted on a shaft for rotation and having one or more blades mounted thereon. The head is generally conical in form, that is, its outer surface has successive sections, one being cylindrical and the succeeding ones being conical with different angles between the elements of each cone and its axis. A bore is formed in the head coaxial with said cylindrical and conical surfaces. The two end faces are normal to the axis of said bore. A slot for receiving the blade is cut in the outer surface of the head. Said slot runs at an angle to a plane through the axis of said bore and crosses that plane within the limits of the head, that is, between its end faces. The blade mounted in said slot has the greater portion of its front or leading face flat. However, said flat face presents a different angle of rake at the different points thereof spaced along the axis of the cutter. At the point where this flat face crosses the plane through the axis, the line of intersection of said face with the axis is radial to said axis, and therefore, has a zero angle of rake. Beyond that point, the rake angle becomes negative. Accordingly, this portion of the blade has a recess or depression ground into it. The surface of said depression adjacent the cutting edge, changes its angle with respect to the flat face of the blade progressively so as to maintain a rake angle of at least 2°. This surface finally merges with the flat face of the blade.

A preferred embodiment of this invention is illustrated in the accompanying drawings, in which.

Figure 8:
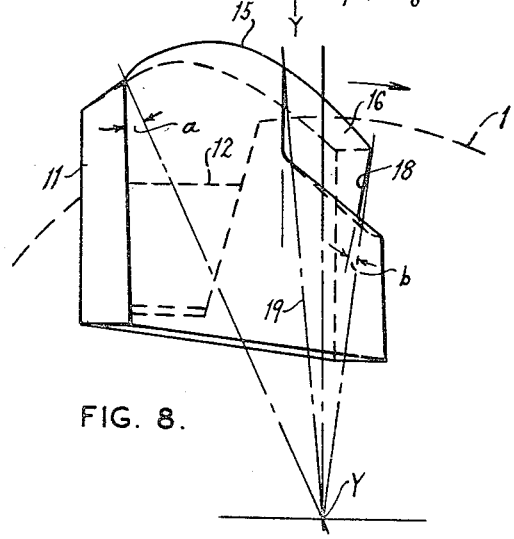
Figure 3:
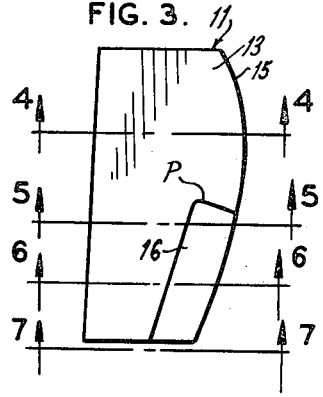
Fig. 3 is a face view of the blade.
Figure 4:
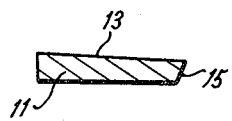

Figs. 4 to 7, inclusive, are sectional views of the blade taken on correspondingly numbered section lines in Fig. 3; and Fig. 8 is a diagrammatic view, somewhat enlarged, representing a projection of the cutter head and a blade mounted therein upon a plane perpendicular to the axis of the cutter.

Referring to the drawing, 1 designates the cutter head generally, which, in the embodiment illustrated, is formed with a cylindrical section 2 and a conical section 3, and a second conical section 4 of steeper angle than the section 3. This head has a top radial face 5 and a bottom radial face 6. The head is formed with a bore 7, said bore and the sections 2, 3, and 4 being coaxial, the axis being represented by the line XY in Fig. 1. The head is formed with one or more slots 8 extending generally lengthwise thereof but at an angle with a plane through the axis XY and perpendicular to the plane of the paper in Fig. 1. The slots 8 are formed with a side face 9 against which the blade may be seated and a face 10 angular with respect to the face 9.

A blade 11 is mounted in each slot 8 with its rear face against the face 9 of the slot. A wedge 12 is then inserted in the slot to bear against the face 10 of the slot and the front face 13 of the blade. Said wedge may be secured in the slot as by cap screws 14 or otherwise. The blade 11 is slightly wedge-shaped, as shown in Figs. 4 to 7, inclusive, with its thicker end in the bottom of the slot so that the pressure of the wedge 12 will securely hold the blade in place.

Figure 1:
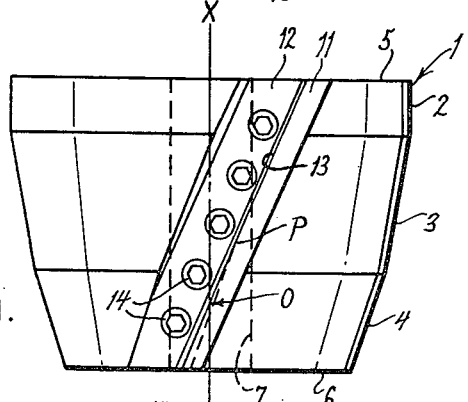
Fig. 1 is a side view of a cutter head with a blade mounted therein in accordance with this invention.

As may be seen from Fig. 1, the front face 13 of the blade extends at an angle to the aforementioned axial plane. The rake angle effective at any point of the cutting edge 15 of the blade will be the angle between the line of intersection of the face 13 with a plane perpendicular to the axis XY and passing through said point of the cutting edge and a radius to the axis XY within said normal plane drawn to said point of the cutting edge. In Fig. 8, the plane of the paper represents such a plane perpendicular to the axis XY, said axis being indicated at Y in Fig. 8. As shown in this figure, the angle of rake thus indicated at the trailing edge of the cutter 11 is the angle $a$, which is taken as positive. It will be clear that this angle becomes less and less as the plane normal to the axis at which these angles are taken in Fig. 8 is moved along said axis toward the leading end of the cutter. At a certain point, indicated approximately at O in Fig. 1, this angle will become zero and beyond that point will be negative.

Figure 5:
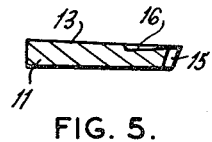
Figure 6:
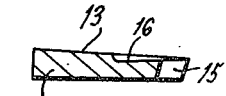
Figure 7:
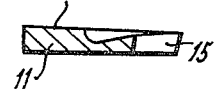

In order to provide a proper rake angle at the leading portion of the cutting edge, a depression is ground into the face 13 of the blade, as shown in Figs. 5, 6 and 7. This depression is indicated at 16. The depression 16 is ground so that it is deepest at the leading end of the blade, as shown in Fig. 7. It becomes gradually shallower as the distance from the leading edge increases, and eventually merges into the face 13 as indicated approximately at the point P in Fig. 1.

As shown in Fig. 8, the surface of the depression 16 is so shaped that any plane parallel to the plane of the paper in Fig. 8 will intersect that surface in a line such as the line 18 which makes a positive angle with the radius 19 within that plane. Such angle is indicated at $b$ in Fig. 8.

The surface 16 may be produced by grinding, for instance, by mounting the blade in a suitable jig so that it may be moved against the surface of a grinding wheel, and varying the position of the blade with reference to the wheel progressively as the blade moves along so as to produce the twisted or warped surface which will maintain the angle $b$ at least 2°. Preferably this angle is kept constant for the length of the depression 16. Such movements can be produced by suitable cam mechanisms by means well known in the art.

Figure 2:
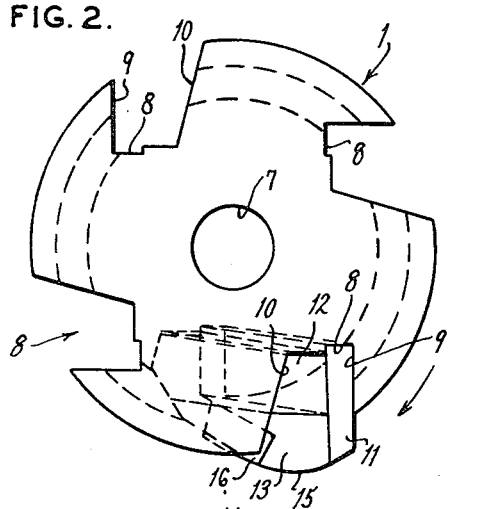
Fig. 2 is an end view of Fig. 1.

In the use of this cutter, the head 1 is usually equipped with a number of blades 11. As shown in Fig. 2, provision is made for four such blades. The head is rotated in the direction indicated by the arrows in the several figures. It will be seen that the end of the blade having the depression 16 is the leading end and engages the work first, after which the point of engagement moves along the blade to the other end thereof. It has been found that this arrangement of blades produces a smooth cut with very little tendency to split the wood at the point where the blade enters or leaves the same. Accordingly, the smooth heel surface is formed. While for some kinds of work a rake angle of less than 2° may be suitable, it has been found that a minimum of 2° seems best for forming shoe heels and the like.

Various changes may be made in the details of construction, within the scope of the appended claims, without departing from the spirit of this invention. Parts of the invention may be used without the whole and improvements may be added while retaining some or all of the advantages of the invention.

We claim:

1. A cutter for a woodworking machine, comprising, a head having end faces and a bore normal thereto adapted for mounting the same on a shaft for rotation, said head having a substantially straight blade-receiving slot in its peripheral portion, said slot extending at an angle to a plane through the axis of said bore and crossing such plane between said end faces, and a flat cutter blade secured in said slot, said blade having a cutting edge and a warped surface adjacent said edge formed to provide a positive rake angle at any point along said edge.

2. A cutter for a woodworking machine, comprising, a head having end faces and a bore normal thereto adapted for mounting the same on a shaft for rotation, said head having a substantially straight blade-receiving slot in its peripheral portion, said slot extending at an angle to a plane through the axis of said bore and crossing such plane between said end faces, and a flat cutter blade secured in said slot, said blade having a flat front face except that a warped surface cut therein is deepest below said front face at its leading end and becomes gradually shallower so as to merge into said front face at an intermediate point of the length of the latter, thereby providing a positive rake angle at all points of the cutting edge of said blade along said warped surface.

3. A cutter for a woodworking machine, comprising, a head having end faces and a bore normal thereto adapted for mounting the same on a shaft for rotation, said head having a substantially straight blade-receiving slot in its peripheral portion, said slot extending at an angle to a plane through the axis of said bore and crossing such plane between said end faces, and a flat cutter blade secured in said slot and having a cutting edge, said blade having a substantially flat front face except that a depression sunk below said face adjacent said cutting edge and starting at the leading end thereof has a surface so formed that its line of intersection with any plane normal to said axis at any point along said axis between said leading end and a point beyond the aforesaid axial plane makes a constant angle of not less than two degrees with a radius to said axis from said cutting edge within said normal plane.

References Cited in the file of this patent

UNITED STATES PATENTS

| | | |
|---|---|---|
| 350,520 | Wood | Oct. 12, 1886 |
| 389,139 | Dumontier | Sept. 4, 1888 |
| 650,924 | Boynton | June 5, 1900 |
| 978,414 | Vivarttas | Dec. 13, 1910 |
| 1,423,192 | Converse | July 18, 1922 |
| 2,608,225 | Kidder | Aug. 26, 1952 |